Jan. 27, 1931.  J. J. TURNER  1,790,393

DEMOUNTABLE RIM

Filed Dec. 19, 1928

INVENTOR.
J. J. Turner,
BY Irving L. McCochran
ATTORNEY

Patented Jan. 27, 1931

1,790,393

UNITED STATES PATENT OFFICE

JOHN JOSEPH TURNER, OF SILVERTON, COLORADO

DEMOUNTABLE RIM

Application filed December 19, 1928. Serial No. 326,971.

This invention relates to demountable wheel rims for automobile wheels and has as one of its objects to provide a rim which will be extremely simple in construction and inexpensive to manufacture and not liable to any disarrangement of its parts while the automobile, upon which it is installed, is being driven.

Another object of the invention is to provide a simple and highly efficient means for securing the rim in place upon the felly of the wheel and likewise novel means for mounting the outer section of the rim upon the inner section so that the sections may be readily separated when removing the tire, the securing means being of a simple and inexpensive nature and one which will not be liable to become disarranged in the use of the wheel.

While the accompanying drawing and the description which is to follow, constitute a disclosure of the preferred embodiment of the invention, it will be understood that various changes may be made within the scope of what is claimed.

Figure 1:
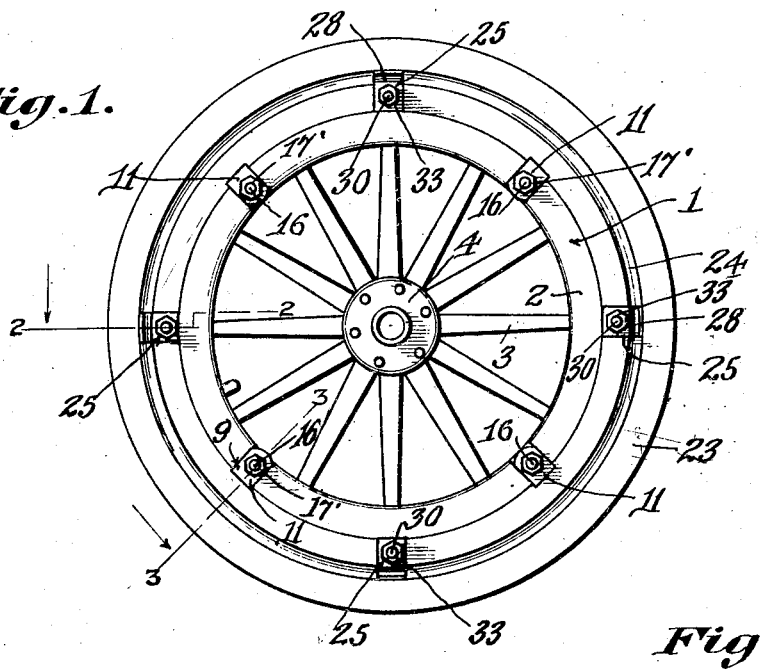
Figure 1 is a view in side elevation of the demountable rim structure embodying the invention.

In the drawing the wheel is indicated in general by the numeral 1 and the felly thereof is indicated by the numeral 2, the usual spokes being indicated by the numeral 3 and the hub by the numeral 4 and these parts being of the usual construction except that the invention contemplates that the circumferential surface of the felly 2 be provided at one side with a beveled shoulder 5 for a purpose which will now be made apparent.

Figures 2, 4:
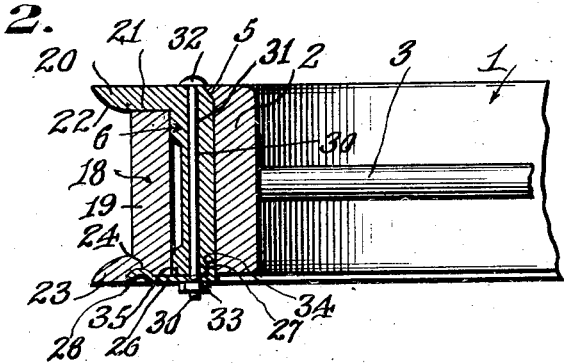
Figure 2 is a detail sectional view taken substantially on the line 2—2 of Figure 1 looking in the direction indicated by the arrow.
Figure 4 is a perspective view of one of the clamping lugs for securing the inner and outer rim sections together.
Figures 3, 5:
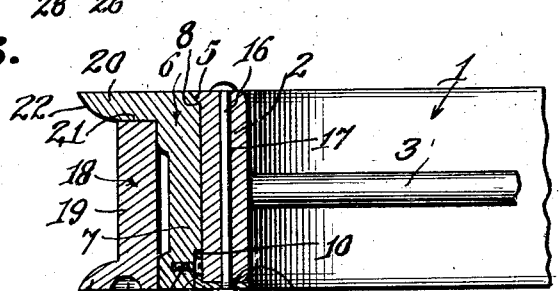
Figure 3 is a similar view taken on the line 3—3 of Figure 1 looking in the direction indicated by the arrow.
Figure 5 is a perspective view of one of the anchoring lugs for holding the inner section of the rim upon the felly.

The inner section of the demountable rim is indicated in general by the numeral 6 and the same comprises a continuous annular body 7 interiorly of a diameter to fit snugly about the felly 2 in the manner clearly shown in Figures 2 and 3 of the drawing, the body 7 being formed at one side and at its inner periphery with a bevel 8 which is continuous and which seats against the beveled shoulder 5 when the section 6 is fitted onto the felly 2. In order that the inner section 6 of the rim may be removably secured upon the felly 2 with its bevel 8 firmly abutting the beveled shoulder 5 of the said felly, a plurality of lugs such as shown in Figure 5 of the drawing and indicated by the numeral 9, are provided and each of these lugs comprises relatively right angularly disposed wings indicated by the numerals 10 and 11, and the wing 10 of each lug is disposed in a recess 12 formed in the inner periphery of the rim section 7 and secured in place by a screw 13 which is fitted through an opening 14 formed in the said wing 10 and threaded into a threaded socket formed in the said body 7 of the section 6, the arrangement being such that the wing 11 will project radially inwardly and in a plane with its outer face flush with the corresponding side face of the rim section as shown in Figure 3. At points corresponding to the points of location of the lugs 9 upon the rim section 6, the felly 2, at that side thereof opposite the side at which the beveled shoulder 5 is located, is formed in its said side with shallow recesses to accommodate the wings 11 of the said lugs 9, and bolts 16 are fitted through transverse openings 17 formed in the felly 2 and through the openings 15 in the wings 11 of the said lugs 9, and nuts 17′ are threaded onto the said bolts and thus serve to secure the said wings of the lugs in the recesses and thus hold the inner section 6 of the rim rigidly in place upon the felly.

In the embodiment of the invention illustrated in Figures 1 to 4 inclusive, the outer section of the rim, which is indicated in general by the numeral 18, comprises an annular body 19 which is interiorly of a diameter to fit about the body 7 of the section 6 of the rim, the section 6 of the rim being provided at that side at which the bevel 8 is formed, and upon its outer circumferential surface, with an outstanding continuous flange 20 having a flat inner face portion 21 against which the adjacent side of the body 19 of the section 18 abuts as clearly shown in Figures 2 and 3, the flange 20 having a portion projecting beyond the outer circumferential surface of the body 19 and formed with a curvilinear face 22 against which the corresponding side of the tire casing may seat. The body 19 of the section 18 is formed upon its outer circumferential side with an outstanding flange 23 which opposes the projecting portion of the flange 20 and against which the other side of the tire casing may seat, and in this embodiment the body 19 of the section 18 of the rim is formed, in that side at which the flange 23 is located, with an annular groove indicated by the numeral 24. Figure 4 of the drawing illustrates retaining lugs for the outer section 18 of the rim, and each of these lugs, which is indicated in general by the numeral 25, comprises a flat sided rectangular body 26 provided at one end with a right angularly projecting lip 27 and, at its other end with an overturned or transversely arcuate tongue 28 the convex side of which is presented at the same side of the body 26 of the lug 25 as is the lip 27, and this tongue is designed to seat at its convex side in the groove 24 in the body 19 of the section 18, each of the lugs 25 being formed in its body portion 26 with a bolt opening 29. Bolts 30 are fitted through openings 31 formed at intervals transversely in the body 7 of the section 6 of the rim and through the openings 29 and each bolt is provided at one end with a head 32 engaging against that side face of the body 7 at which the bevel 8 is provided, a nut 33 being threaded onto the other end of each bolt and being tightened to bear against the outer side of the body portion 26 of the respective lug 25, it being observed, by reference to Figure 2 of the drawing, that the lip 27 seats flush in a recess 34 formed in the inner side of the said body 7 of the section 6 and that the body 26 of the lug 25 seats flush in a recess 35 formed in the side face of the body 7 of the section 6. It will be understood at this point that the lugs 25 have locking engagement with the body 7 of the section 6 of the rim and likewise with the body 19 of the section 18 of said rim, and constitute an efficient means for holding the sections of the rim assembled.

Figure 6:
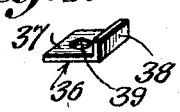
Figure 6 is a perspective view illustrating a modification of the lug for holding the outer rim section upon the inner section.

It will be understood from the foregoing description that by removing the nut 33, the rim section 18 may be readily separated from the inner rim section 6, carrying with it the tire which is mounted upon the section 18 and which has previously been held between the flanges 20 and 23 of the sections 6 and 18 respectively. It will also be evident that the section 6 of the rim may be readily mounted upon a felly formed as in the case of the felly 2 shown in the drawing and may be readily disconnected therefrom by removing the nuts 17'.

Where the rim is of such construction that the section 18 is not provided with the annular groove 24, a lug such as illustrated in Figure 6 of the drawing and indicated by the numeral 36, may be employed in lieu of the lug 25, this lug comprising a rectangular body portion 37 corresponding to the body portion 26 of the lug 25 and having a lip 38 corresponding to the lip 27 of the said lug 25. This lug 36 will be secured in place by bolts corresponding to the bolts 30, being provided with a bolt opening 39, for that purpose, and that end of the body portion 37 opposite the end at which the lip 38 is located will project beyond the outer circumference of the body 7 of the section 6 of the rim and overlap a portion of the corresponding side face of the body 19 of the section 18.

Having thus described the invention, what I claim is:

In a demountable wheel rim, an inner section, an outer section fitting upon said inner section, said outer section having an annular groove in one side face, said inner section having axially extending recesses projecting inwardly from one side face, a plurality of lugs, each lug consisting of a flat body having an angularly extending lip at one end and an arcuate tongue at the other end, the lip and tongue extending in the same direction, said lugs bearing upon said sections so that the tongues will fit in said groove and the lips in said recesses, and means for holding said lugs in assembled position, whereby said sections will be held together, as and for the purposes set forth.

In testimony whereof I affix my signature.

JOHN JOSEPH TURNER.